United States Patent [19]

Dammann et al.

[11] Patent Number: 4,976,654
[45] Date of Patent: Dec. 11, 1990

[54] SELF-PROPELLING HARVESTER THRESHER

[75] Inventors: Johannes Dammann; Franz Heidjann; Heinrich Roderfeld, all of Harsewinkel, Fed. Rep. of Germany

[73] Assignee: Claas Ohg, Harsewinkel, Fed. Rep. of Germany

[21] Appl. No.: 191,892

[22] Filed: May 5, 1988

[30] Foreign Application Priority Data

May 23, 1987 [DE] Fed. Rep. of Germany ....... 3717501

[51] Int. Cl.⁵ ............................................... A01F 7/06
[52] U.S. Cl. ...................................... 460/80; 56/16.5
[58] Field of Search ............... 130/27 T, 27 R, 22 A, 130/23; 56/16.5, 14.6; 460/80, 81

[56] References Cited

U.S. PATENT DOCUMENTS

| 3,439,683 | 5/1969 | Keller | 130/27 T |
| 3,589,111 | 6/1971 | Gullickson | 56/14.6 |
| 4,108,150 | 8/1978 | Shaver | 130/27 T |
| 4,178,942 | 12/1979 | Nusser | 130/27 T |
| 4,284,086 | 8/1981 | Williams | 130/27 T |
| 4,535,787 | 8/1985 | Underwood | 130/27 T |
| 4,653,515 | 3/1987 | Tophinke | 130/27 T |
| 4,716,908 | 1/1988 | Helmes | 130/27 T |
| 4,739,773 | 4/1988 | West et al. | 130/27 T |

Primary Examiner—John Weiss
Attorney, Agent, or Firm—Michael J. Striker

[57] ABSTRACT

A self-propelling harvester thresher comprises a threshing unit, a separating unit located downstream of the threshing unit, the separating unit extending along a traveling direction of the harvester thresher and operating in accordance with the principle of axial flow, and a transporting unit associated with the separating unit and transporting a grain-chaff mixture, the transporting unit being located laterally near the supporting unit.

6 Claims, 2 Drawing Sheets

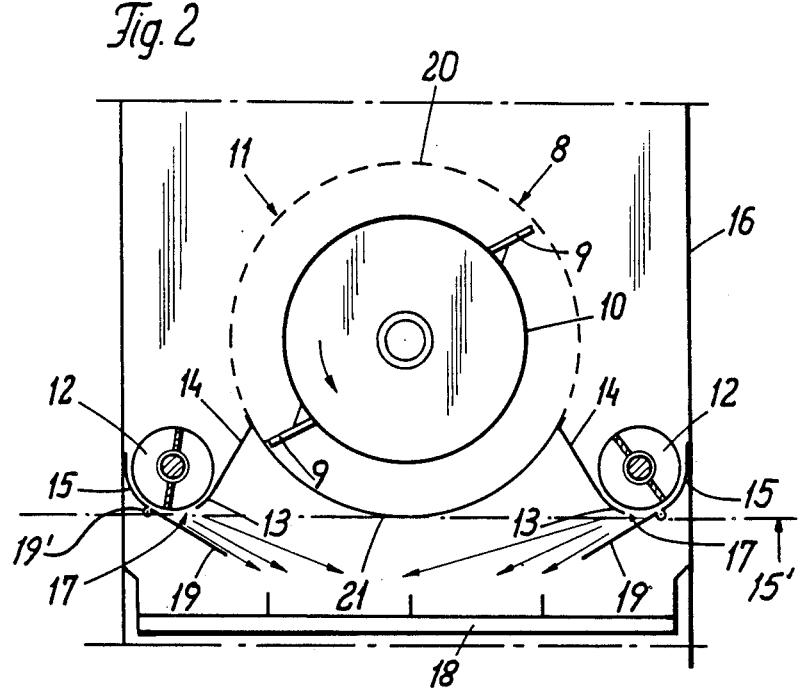
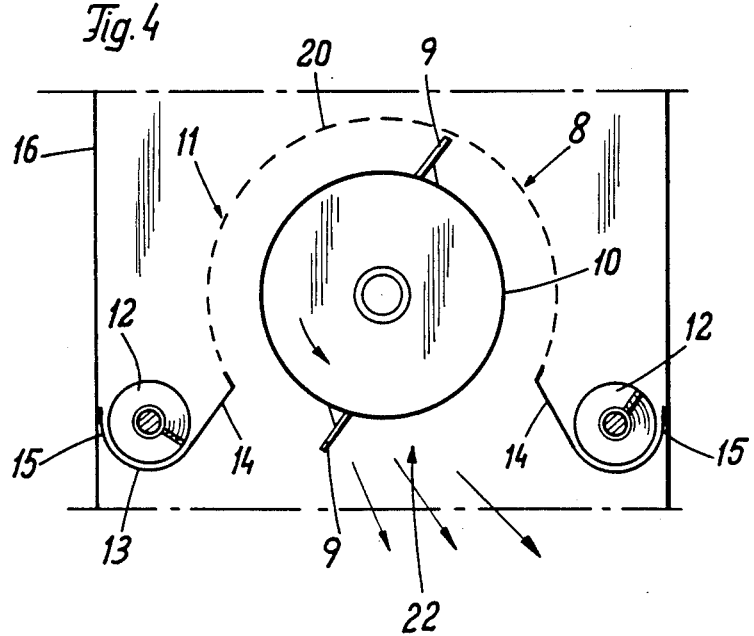

SELF-PROPELLING HARVESTER THRESHER

BACKGROUND OF THE INVENTION

The present invention relates to a self-propelling harvester thresher which has a separating device extending along a traveling direction of the machine and operating in accordance with the principle of an axial flow, and at least one transporting device which is associated with a separating device and transports a grain-chaff mixture to a sieve device.

Harvester threshers of the above-mentioned general type are known in the art. One of such harvester threshers is disclosed, for example, in the U.S. Pat. 4,611,605. It has a separating device which separates the remaining grain content from the pre-threshed straw. A transporting screw is arranged under the separating device. It transports the separated remaining grain which is mixed with chaff, opposite to the traveling direction of the harvester thresher and throws the same onto a sieve device. Since in modern harvester threshers with high throughput the respective aggregates have a big volume, the known harvester threshers which have the separating device and the return screw for the grain-chaff mixture located under one another, produce an unfavorable location of the center of gravity on the one hand. On the other hand, they have such a structural height which cannot be brought in correspondence with the maximum allowable height for the transportation of the harvester thresher on open streets and for the transportation of harvester thresher with the railroad.

SUMMARY OF THE INVENTION

Accordingly, it is an object of the present invention to provide a harvester thresher of the abovementioned general type which avoids the disadvantages of the prior art.

More particularly, it is an object of the present invention to provide a harvester thresher of the abovementioned type in which the separating device, despite the associated grain-shaff transporting device, can be arranged relatively deep in the housing of the harvester thresher, without compromising of the required throughput of the machine.

In keeping with these objects and with others which will become apparent hereinafter, one feature of the present invention resides, briefly stated, in a harvester thresher in which the transporting device for the gain-chaff mixture is arranged laterally near the separating device.

In accordance with an advantageous feature of the present invention, the lower limit of the separating device and the lower limit of the transporting device are located on a same horizontal ideal line extending transversely to the traveling direction of the harvester thresher.

For making the separating device active over its whole length, the rear end of the transporting device and the rear end of the separating device coincide with one another.

In accordance with a further feature of the present invention, the transporting device is formed as a transporting screw or conveyor which operates in a transporting direction opposite to the traveling direction of the harvester thresher. The transporting screw has in its lower region a trough which is provided with a throwing-out gap at its discharge end.

In order to ensure that all threshed remaining grains reach the transporting device, one longitudinal side of the trough tightly abuts against the separating housing of the separating device, while the other longitudinal side of the trough tightly abuts against a wall of the harvester thresher.

For adaptation to different land conditions and different types of foods to be harvested, the trough in the region of the throwing out gap is provided with a grain-chaff guiding sheet.

A further important feature of the present invention is that each side of the separating device is associated with one transporting device or transporting element.

In an advantageous manner, the separating housing of the separating device is formed above the transporting device as a sieve. In the region below the transporting device it is formed as a solid wall.

Finally, the transporting devices or elements are formed as exchangeable mounting units for facilitating their repairs and immediately taking care of damages.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing a section of the harvester thresher of FIG. 1, taken along the line II—II;

FIG. 4 is a section of the harvester thresher in accordance with the present invention shown in FIG. 1 taken along the line IV—IV.

DESCRIPTION OF A PREFERRED EMBODIMENT

Figure 1:
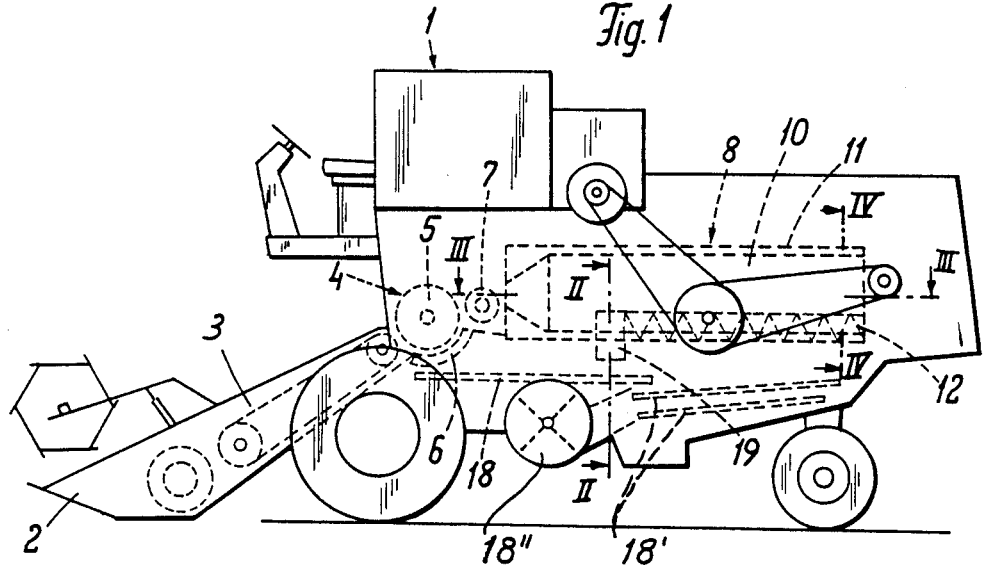
FIG. 1 is a side view of a harvester thresher in accordance with the present invention.

A self-propelling harvester thresher in accordance with the present invention is identified as a whole with reference numeral 1.

The harvester thresher has a front cutting mechanism 2 and an inclined conveyor 3 which is located after the cutting mechanism. A threshing device 4 follows the inclined conveyor 3. The threshing device includes a threshing drum 5 which extends transversely to the traveling direction of the harvester thresher, and a threshing basket 6 which is associated with the threshing drum. The harvested product which is transported by the inclined conveyor 3 is threshed in the threshing device 4. Then a main part of the threshed out straw is supplied by a transfer drum 7 to a separating device 8.

The separating device 8 extends in a traveling direction of the harvester thresher and operates in accordance with the principle of an axial flow system.

The separating device has a separating rotor 10 provided with screw sheets 9, and a housing 11 which surrounds the rotor. Transporting screws 12 are arranged at both sides near the housing 11. They are partially surrounded from above by respective troughs 13. The troughs 13 have inner longitudinal ends 14 which tightly abut against the housing 11 of the separating device 8. The troughs 13 also have outer longitudinal ends 15 which tightly abut against a machine housing 16 of the harvester thresher. Each trough 13 has a throwing out gap 17 which opens toward a return bottom 18. A sieve unit includes two perforated sieve sheets 18' located behind the return bottom and one above the other. A pressure wind blower 18" is associated with the sieve sheets. The sieve unit separates the chaff from the grain. Finally, a guiding sheet 19 is located under each throwing out gap 17 of the respective troughs 13 as shown in FIG. 2. The guiding sheets 19 have adjustable turning positions. For this purpose they are connected by a hinge to the troughs 13.

Figure 3:
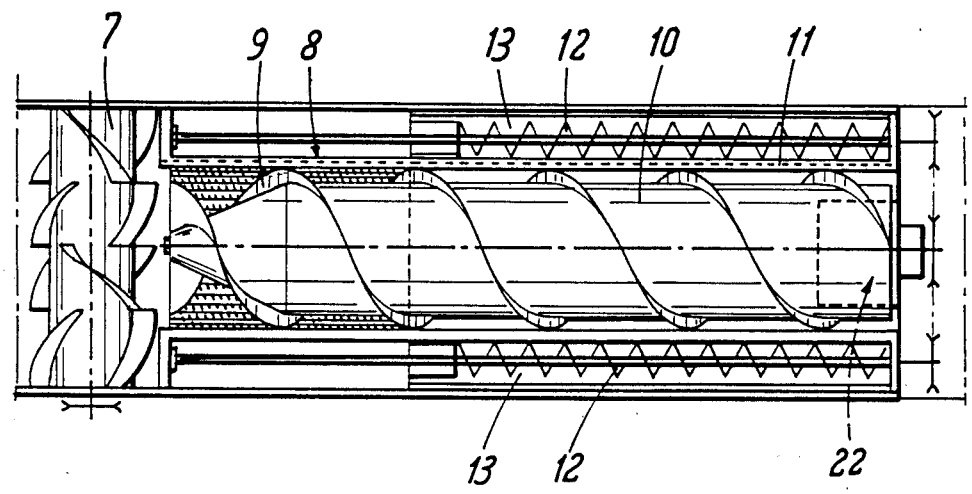
FIG. 3 is a view showing a section of the harvester thresher in accordance with the present invention, taken along the line III—III.

The transporting screws 12 transport the chaff-grain mixture to the sieve unit in a direction which is opposite to the traveling direction of the harvester thresher. The corn-chaff mixture which is transported by the transporting screws 12 falls at the end of the transporting screws through the throwing gaps 17 in the troughs 13 onto the return bottom 18. The lengths of the throwing out gaps 17 which are provided in the front regions of the troughs as considered in the traveling direction of the harvester thresher substantially corresponds to the length of the guiding sheets 19 as can be clearly seen from FIGS. 1 and 3.

The lower limit of the transporting unit 12, 13 and of the separating device 8 line on the same horizontal line 15'. Thereby a favorable position of the center of gravity of the harvester thresher is obtained, since the transporting unit 12, 13 is located near the separating device 8, and not under the latter.

The housing 1 of the separating device 8 is formed as a sieve 20 in its region located above the plane in which the troughs 13 abut against the housing 11. On the other hand, the housing 11 is formed as a closed wall 21 in the region located under the troughs 13. This closed wall 21 is however interrupted at the rear throwing-out end for forming a straw-throwing-out opening 22. As can be seen also from FIGS. 1 and 3 the rear ends of the transporting screws 12 and the rear ends of the troughs 13 extend rearwardly to the same point as the separating device 8. This provides the advantage in that the separating device 8 can act over its whole length.

The harvester thresher in accordance with the present invention operates so that on the one hand it has a very high throughput and on the other hand the measures are taken that the straw thrown onto the field is completely threshed or in other words the thrown straw has no residual products. In the inventive harvester thresher the cut product is threshed by the threshing device which includes the threshing drum 5 and the threshing basket 6. The threshed grain falls through the slot of the threshing basket 6 onto the preparation bottom which is driven reciprocatingly. The bottom 18 transports the grain with chaff fractions to the sieve sheets 18' which also reciprocate. The blower 18" blows the wind through the perforated sheets 18', so that lighter chaff particles are thrown rearwardly. The heavier grain particles fall through the holes of the sieve sheets 18' downwardly and transported by a not shown elevating element or conveyor to the grain tank 1. Since the product transported from the threshing unit is not completely threshed, the straw mat loaded with a considerable grain fraction is supplied to the separating device 8 composed of the separating rotor 10 and the housing 11 provided with a sieve region. Since the rotor is provided with helical screw sheets 9, the straw during the rotation of the rotor 10 is transported rearwardly. During this movement the residual grains and also a chaff fraction move through the sieve openings of the housing 11 outwardly and fall down into both troughs located near the separating device 8. The transporting screws provided in the troughs transport the grain-chaff mixture opposite to the travelling direction, so that the grain-chaff mixture moves through both throwing out gaps 17 onto the preparation bottom 18. The grain-chaff mixture which fell through the gaps of the threshing basket 6 is transported also to both sieve sheets 18' arranged one above the other. The lighter chaff fractions are blown away by the blower 18" and the grains fall through the openings of the sieves 18' downwardly. Than as described above, a not shown conveyor transports the grain upwardly to the tank 1.

It will be understood that each of the elements described above, or two or more together, may also find a useful application in other types of constructions differing from the types described above.

While the invention has been illustrated and described as embodied in a self-propelling harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A self-propelling harvester thresher, comprising a threshing unit; a separating unit located downstream of said threshing unit, said separating unit extending along a traveling direction of the harvester thresher and operating in accordance with the principle of axial flow; and a transporting unit associated with said separating unit and transporting a grain-chaff mixture, said transporting unit being located laterally near said separating unit, said transporting unit and said separating unit having respectively lower limits, said lower limits of said transporting unit and said separating unit being located approximately on a horizontal line extending transversely to the traveling direction of the harvester thresher.

2. A self-propelling harvester thresher as defined in claim 1, wherein said transporting unit includes a transporting screw and a trough which surrounds the lower region of said transporting screw, said separating unit having a separating housing; and further comprising a machine wall, said trough of said transporting unit having one longitudinal end abutting against said separating housing at another longitudinal end tightly abutting against said machine wall.

3. A self-propelling harvester thresher as defined in claim 2, wherein said trough has a discharge end provided with a throwing out gap; and further comprising a grain-chaff guiding sheet associated with said trough in the region of said throwing out gap and having an adjustable turning position.

4. A self-propelling harvester thresher as defined in claim 1, wherein said transporting unit has two transporting elements arranged at both sides of said separating unit and having lower limits located on the horizontal line extending transversely to the traveling direction of the harvester thresher.

5. A self-propelling harvester thresher as defined in claim 2, wherein said trough abuts against said separating housing in predetermined plane, said separating housing being formed as a sieve above said plane and as a closed wall below said plane.

6. A self-propelling harvester thresher as defined in claim 5, wherein said closed wall has a rear throwing-out end and is provided at said end with a straw-throwing out opening.

* * * * *